No. 866,807. PATENTED SEPT. 24, 1907.
D. L. PITTS.
DRIP CUP OR RECEPTACLE.
APPLICATION FILED APR. 24, 1907.
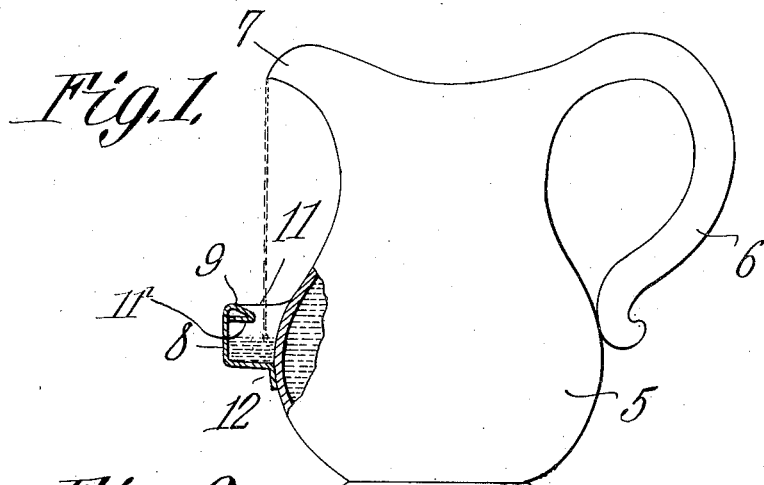
Fig. 1.
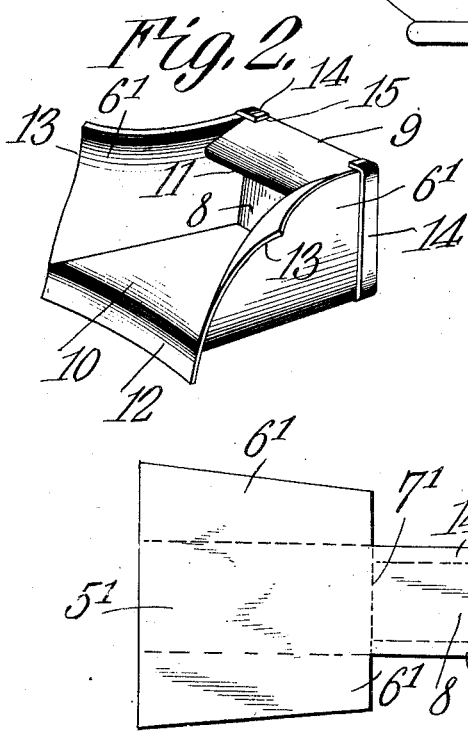
Fig. 2.
Fig. 3.
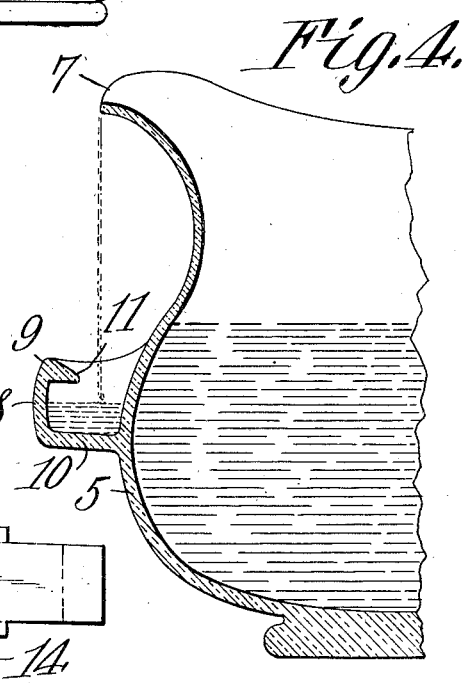
Fig. 4.
WITNESSES:
David L. Pitts,
INVENTOR.
By C. A. Snow & Co.
ATTORNEYS

UNITED STATES PATENT OFFICE.

DAVID L. PITTS, OF PAINTED POST, NEW YORK.

DRIP CUP OR RECEPTACLE.

No. 866,807.  Specification of Letters Patent.  Patented Sept. 24, 1907.

Application filed April 24, 1907. Serial No. 370,087.

*To all whom it may concern:*

Be it known that I, DAVID L. PITTS, a citizen of the United States, residing at Painted Post, in the county of Steuben and State of New York, have invented a new and useful Drip Cup or Receptacle, of which the following is a specification.

This invention relates to drip catchers for pitchers, coffee pots, tea-pots, gravy-bowls and similar liquid containing vessels and has for its object to provide a cup or receptacle adapted to catch and retain the drippings from the discharge spout of the vessel thereby to prevent the same from staining or otherwise soiling the table linen.

A further object of the invention is to provide a drip cup or receptacle having a guard or shield extending laterally from one wall thereof so as to prevent the liquid in the said cup from escaping from the catcher when the pitcher or other vessel is tilted to discharge a portion of the contents thereof.

A further object is to form the guard or shield with an inclined or beveled face for deflecting the drippings into the cup or receptacle.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a side elevation of a pitcher provided with a drip cup or receptacle constructed in accordance with my invention. Fig. 2 is a perspective view of the drip cup or catcher detached. Fig. 3 is a plan view of the blank from which the cup or receptacle is formed. Fig. 4 is a longitudinal sectional view illustrating a modified form of the invention.

Similar numerals of reference indicate corresponding parts in all of the figures of the drawings.

The improved drip cup or receptacle forming the subject matter of the present invention is principally designed for use in connection with milk pitchers, gravy bowls and other liquid containing receptacles for catching the drippings from the discharge spout of the vessel thereby to prevent the same from staining or otherwise soiling the table linen and by way of illustration is shown in connection with a milk pitcher of the ordinary construction in which 5 designates the body of the pitcher, 6 the handle and 7 the discharge spout.

The cup or receptacle may either be formed integral with the body of the pitcher or subsequently attached thereto and in Figs. 1 and 2 of the drawings there is shown a cup or receptacle formed of sheet metal and adapted to be secured to the exterior walls of the pitcher below the discharge spout 7.

The receptacle is preferably stamped from a single sheet metal blank 5' having its opposite longitudinal edges bent upwardly to form the side walls 6' of the receptacle and one end thereof reduced and adapted to be folded upwardly on the line 7' to form the front wall 8 of the receptacle. The metal forming the front wall 8 of the receptacle is bent laterally within the cup and thence bent inwardly in contact with the front wall 8 to form a laterally extending guard or shield 9 adapted to prevent the escape of the liquid in the receptacle when the pitcher or other vessel is tilted to discharge a portion of the contents thereof.

The cup or receptacle preferably projects laterally beyond the free end of the discharge spout of the pitcher so that the drippings from said spout will fall into the cup and thus prevent the same from splashing on the table linen and staining or otherwise soiling the same.

Attention is here called to the fact that the upper face of the guard or shield is inclined downwardly in the direction of the bottom 10, as indicated at 11, so as to deflect any drops of liquid from the discharge spout downwardly within the cup or receptacle should said liquid fall on the guard. The lower wall 11' of the guard or shield is preferably disposed parallel with the base 10 of the receptacle so as to prevent gravy or other viscous or semi-viscous material from lodging beneath the inclined face of the guard and also to permit the interior of the cup or receptacle to be readily cleaned when necessary.

The cup or receptacle when formed of metal may be attached to the exterior walls of the pitcher in any suitable manner and in the present instance is formed with a depending flange 12 preferably curved to conform to the adjacent exterior walls of the pitcher and adapted to be soldered or otherwise rigidly secured thereto.

Attention is here called to the fact that the inner ends of the side walls 6' are bent or deflected laterally, as indicated at 13 so as to form a relatively broad mouth for the receptacle and thus catch or receive any portion of the liquid that may flow downwardly from the spout 7 over the exterior walls of the vessel and deflect the same into the catcher or cup. The side walls 6' may be secured to the end walls 8 by lap seams, solder or otherwise, but it is preferred to bend the opposite ends of the end wall 8 laterally to form over-lapping flanges 14 which bear against the exterior of the side walls 6', said flanges being provided with extensions the ends of which are bent inwardly over the inclined face of the guard or shield to produce securing lugs 15.

It will thus be seen that the drippings from the discharge spout of the pitcher or other containing vessel if deposited on the inclined face of the guard or shield would be deflected downwardly within the receptacle while the liquid in the receptacle is prevented from escaping from the cup when the pitcher or vessel is tilted by means of the lower portion 11 of said guard or shield.

In Fig. 4 of the drawings there is illustrated a modified form of the invention in which the drip-catcher or receptacle is formed integral with the pitcher or other vessel, the construction of the cup being otherwise the same as that shown in Fig. 1 of the drawings.

While the cup or drip catcher illustrated in Fig. 1 is shown and described as being formed of metal it will of course be understood that the same may be formed integral with and of the same material as the body of the pitcher or other vessel to which it is attached.

It will also be understood that the drip cups or receptacles may be made in different sizes and shapes and curved to conform to the general configuration of the body or mouth of the containing vessel without departing from the principle or sacrificing any of the advantages of the invention.

From the foregoing description it will be seen that there is provided an extremely simple, inexpensive and efficient device admirably adapted for the attainment of the ends in view.

Having thus described the invention what is claimed is:

1. The combination with a liquid containing vessel having a discharge spout, of a drip cup secured to the receptacle beneath the spout and having a flat horizontally disposed bottom wall and oppositely disposed side walls curved laterally for attachment to the adjacent exterior wall of the vessel, and a guard projecting laterally from the front wall of the cup and having its upper face inclined downwardly and its lower face extended in the direction of the front wall of the cup and disposed parallel with the bottom wall of the latter.

2. The combination with a liquid containing vessel having a discharge spout, of a drip cup secured to the exterior wall of the receptacle below the discharge spout and having a flat horizontally disposed bottom wall, and a guard extending inwardly from the front wall of the cup and having its lower face inclined downwardly and terminating short of the adjacent wall of the vessel and its lower face disposed parallel with the bottom wall of said cup.

3. The combination with a liquid containing vessel having a discharge spout, of a drip cup secured to the exterior walls of the vessel beneath the discharge spout and provided with an inwardly and downwardly extending guard, the lower face of which is disposed parallel with the bottom of the cup with one edge thereof bearing against the interior front wall of said cup.

4. A drip cup for liquid containing vessels formed of a sheet metal blank having its opposite longitudinal edges bent upwardly to form vertically disposed side walls and one end thereof reduced and bent upwardly to form a front vertical wall, the end of the front wall being extended laterally between the side walls and thence bent upon itself for attachment to the vertical front wall to form a guard or shield.

5. A drip cup for liquid containing vessels formed of a single blank having its opposite longitudinal edges bent upwardly and laterally to form side walls and one end thereof bent upwardly to form a front wall, the free end of the material forming the front wall being bent inwardly and downwardly between the side walls to form a guard or shield, there being flanges formed on the opposite edges of the front wall and adapted to over-lap the side walls with their free ends bent downwardly in engagement with the guard or shield.

6. A drip cup for liquid containing vessels comprising a base having oppositely disposed side walls connected by a front wall the upper end of which is bent laterally and downwardly between the side walls and thence bent upon itself and extended in the opposite direction for attachment to the front wall to form a guard or shield, the rear end of the cup being open and the bottom thereof bent downwardly at the open end of the cup to form a depending attaching flange.

In testimony that I claim the foregoing as my own, I have hereto affixed my signature in the presence of two witnesses.

DAVID L. PITTS.

Witnesses:
E. HUME TALBERT,
JAS. M. WALKER.